United States Patent [19]
McNally et al.

[11] 3,707,835
[45] Jan. 2, 1973

[54] RAKE

[75] Inventors: George P. McNally, Jackson Heights, N.Y.; Edward A. Jonasch, Syracuse, Ind.

[73] Assignee: Glastool Corporation, Brooklyn, N.Y.

[22] Filed: March 18, 1971

[21] Appl. No.: 125,697

[52] U.S. Cl. .........56/400.01, 56/400.17, 56/400.21, 161/93, 161/DIG. 4
[51] Int. Cl. .................................................A01d 7/00
[58] Field of Search.........56/400.01, 400.17, 400.18, 56/400.21; 161/93, 165, DIG. 4

[56] References Cited

UNITED STATES PATENTS

| | | | |
|---|---|---|---|
| 3,574,104 | 4/1971 | Medler | 161/93 X |
| 2,477,407 | 7/1949 | Grant et al. | 161/93 X |
| 2,571,692 | 10/1951 | Dubois | 161/DIG. 4 |
| 2,663,987 | 12/1953 | Biener | 56/400.17 |
| 1,780,748 | 11/1930 | Fisher | 56/400.17 |
| 1,970,616 | 8/1934 | Montan | 56/400.17 |
| 2,720,745 | 10/1955 | Melvin | 56/400.17 |

FOREIGN PATENTS OR APPLICATIONS

| | | | |
|---|---|---|---|
| 230,738 | 10/1960 | Australia | 56/400.17 |
| 565,919 | 11/1958 | Canada | 56/400.17 |

OTHER PUBLICATIONS

J. Owens–Corning Fiberglas, "Textile Fiber Materials for Industry," February 1964, pages 28–32.

*Primary Examiner*—Louis G. Mancene
*Assistant Examiner*—J. A. Oliff
*Attorney*—Lettvin & Gerstman

[57] ABSTRACT

A garden rake in which the tines are formed of the heat and pressure molded product of a plurality of stacked layers of collimated glass filaments extending substantially in the longitudinal direction of the tines. Each layer of glass filaments is supported by a substrate and is coated with resinous means.

3 Claims, 5 Drawing Figures

INVENTORS
GEORGE P. MC NALLY
EDWARD A. JONASCH
BY Lettvin & Gerstman
ATTORNEYS

INVENTORS
GEORGE P. MC NALLY
EDWARD A. JONASCH
BY *Lettvin & Gerstman*
ATTORNEYS

RAKE

BACKGROUND OF THE INVENTION

Prior art garden rakes generally have tines formed of either bamboo or metal. Bamboo tines are typically heat-shaped and the assembly is supported by one or more lateral reinforcements of metal wire or the like. When such lateral reinforcements are broken under stress or repeated use, the bamboo rakes will become inoperative. Bamboo is also susceptible to organic deterioration because of its cellulosic nature, and being relatively soft, it rapidly wears or abrades in service.

Prior art tines fabricated from steel strips also require lateral reinforcement in many cases. The steel tines are also subject to corrosion and breakage of the lateral reinforcement. Failure most frequently occurs because the steel tines are worked past their elastic limit or because of loss of temper from fatigue, resulting in permanent distortion of the tines.

It is very desirable that the tines of a garden rake have a relatively low modulus of elasticity to tensile strength ratio. In general, the effectiveness of the garden rake is substantially inversely proportional to this ratio. Typical carbon steel used in the manufacture of garden rake tines has a modulus of elasticity of 30,000,000 psi and an ultimate tensile strength of about 200,000 psi. The modulus to tensile strength ratio of such steel is therefore 150. Typical bamboo used in garden rake tines has a modulus of elasticity of approximately 4,100,000 psi and an ultimate tensile strength of 35,000 psi. The modulus to tensile strength ratio of such bamboo tines is 117.

It is also desirable that the tine material have a mass that enables it to provide good sweeping action without destroying the plant or grass root structure during the raking process. One of the problems with steel tines is that their high density may result in undesired destruction of plant or grass root structure.

Accordingly, it is an object of the present invention to provide tines which have a low modulus to tensile strength ratio and have a high resistance to moisture and outdoor elements.

It is a further object of the invention to provide garden rake tines which have extremely high fatigue strength, good spring action and which permit relatively free vibration resulting in displacement of leaves that tend to lodge between the tines.

A further object of the present invention is to provide a method for producing garden rake tines which have the above-mentioned desired properties, and which production method is very efficient to enable the production of such tines to be competitively priced with bamboo and metal tines.

Other objects and advantages of the present invention will become apparent from the following description and claims, and from the illustrations in the accompanying drawings.

BRIEF DESCRIPTION OF THE INVENTION

In accordance with the present invention, there is provided a garden rake having a hub for connection to a handle and a plurality of tines projecting from the hub. The improvement comprises tines which are formed of the heat and pressure molded product of a plurality of stacked layers of collimated glass rovings extending substantially in the longitudinal direction of the tine. A substrate supports each layer of glass rovings and resinous means impregnate the substrate and rovings, to form tines having a relatively low modulus and high tensile strength.

In one embodiment of the invention, the modulus of elasticity of tines produced in accordance with the principles of the present invention is about 5,400,000 psi and its tensile strength is 180,000 psi. This results in a modulus to tensile strength ratio of 30.

In the illustrative embodiment, the roving comprise a number of glass filaments each having a generally circular cross-sectional configuration and a diameter that is less than 0.001 inch. The substrate comprises glass mat having a thickness of between 0.005 inch and 0.015 inch.

In one embodiment of the invention, the tines are produced by forming a moldable mass for introduction to a mold. The moldable mass is placed in a mold to heat and compress it to a solid product comprising a plurality of tines lying parallel to each other in alternately stepped relationship. Top corners of alternating tines are frangibly connected to the bottom corners of adjacent tines whereby the tines can be easily separated for subsequent connection to the hub of a garden rake. In the illustrative embodiment, the mold is of a size to form a solid product at least twice the length of a rake tine, and the solid product is severed transversely to form two sets of parallel tines.

In one embodiment of the invention, the garden rake includes a hub that takes the form of a conical section, the hub having an arcuately shaped rim from which the tines extend and having an arcuate body. The hub has means for receiving and holding the tines in position whereby they radiate outwardly from their inboard ends, and in this manner each of the tines can be substantially identical in size and provide an excellent sweeping action.

A more detailed explanation of the invention is provided in the following description and claims.

DETAILED DESCRIPTION OF THE ILLUSTRATIVE EMBODIMENTS

Figure 1:
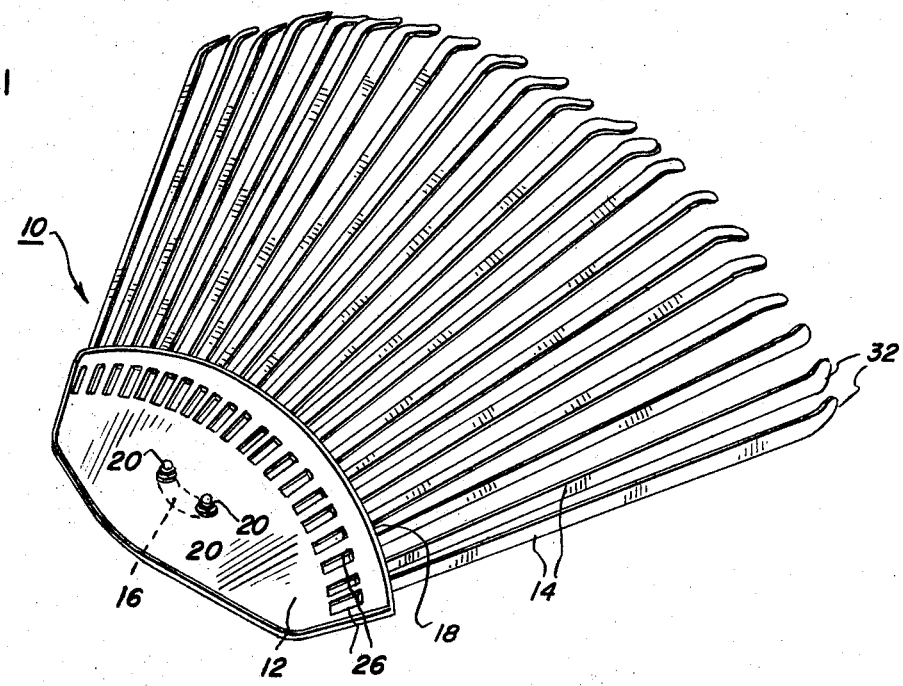
FIG. 1 is a perspective view of a garden rake hub and tines constructed in accordance with the principles of the present invention.
Figure 2:
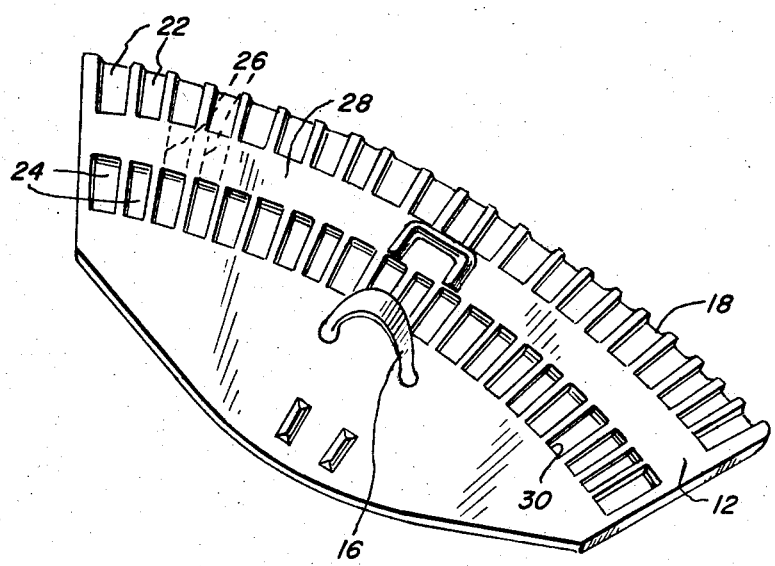
FIG. 2 is a perspective view of the underside of the hub of FIG. 1.

Referring to FIGS. 1 and 2, garden rake 10 comprises a hub 12 having tines 14 connected thereto and extending therefrom, and carrying a U-bolt 16 for fastening a handle to the hub.

Hub 12 is molded as a one-piece unit formed of plastic or other substance which can be heat and pressure molded and is substantially impervious to moisture. The hub 12 has an arcuately shaped outer rim 18 from which tines 14 extend and has an arcuate body which is symmetrical about a central line bisecting fasteners 20. Hub 12 is a substantially true conical section.

The hub 12 defines a number of grooves 22 which are contiguous with rim 18 and a number of spaced grooves 24 which are spaced from rim 18 and which each align with one of the grooves 22 to provide a reception area for each of tines 14. Grooves 22 and 24 communicate with each other via slots 26 which combine to form an arcuate pressure member 28 spaced inwardly of rim 18 for applying a force against a portion of each tine adjacent its inboard end. Pressure member 28 helps retain the inboard end firmly against the hub, permits limited vibration of the portion of the tine between the pressure member 28 and rim 18, and permits free vibration of the outboard portion of tine 14. The inboard portion 30 of each of grooves 24 is adapted to receive means such as a suitable cement, for fastening the inboard ends of tines 14 to hub 12.

It can be seen that each of the tines has a bend 32 which is generally toward the direction of the center of an imaginary circle having an arc of its periphery formed of a line along the arcuate body of hub 12. Because of the arcuate shape of hub 12 and the manner in which grooves 22, 24 radiate outwardly and are in alignment with each other, each of the tines can be identical in size and the resulting connected structure, as shown in FIG. 1, will comprise radially extending tines which are curved in a manner to provide an excellent sweeping action. Efficiency of manufacture is achieved by enabling each of the tines to be identical in configuration.

Figure 3:
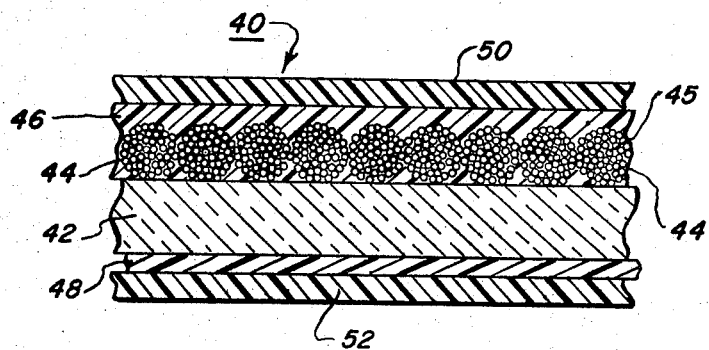
FIG. 3 is a greatly enlarged cross-sectional view of one layer of the laminate which is molded to form the tines of the FIG. 1 rake.

The method of producing the tines will now be discussed. Referring to FIG. 3, a continuous was 40 is formed comprising a substrate 42 formed of glass mat which is well-known in the art, typically having a thickness of 0.005 inch to 0.015 inch. Such glass mat is sometimes known in the art as a glass "veil" or a glass "surface mat."

A number of collimated glass rovings 44 are laid on the glass mat and extend in the longitudinal direction of the web. These rovings preferably contain between 20 and 60 elongated filaments 45 each having a substantially circular cross-sectional configuration with a diameter of less than 0.001 inch. Such glass rovings are sold by Owens-Corning Fiberglas, PPG Industries, Inc., Johns-Manville, Ferro Corporation, and others. The rovings are laid on substrate 42 in substantial abutting and parallel relationship with each other. A layer of fire retardant and light stable resinous material 46 and a layer of similar resinous material 48 are used to impregnate glass rovings 44 and mat 42 and the resinous material is utilized to maintain the rovings and mat in place. Although numerous resins could be used, as a specific example with no limitation intended, we prefer to use a chlorinated polyester resin such as Polylite resin sold by Reichold Chemicals or Hetron resin sold by Hooker Chemical. Mat 42, rovings 44 and the resinous material 46, 48 is sandwiched between outer films 50 and 52. Films 50 and 52 are preferably 0.002 inch to 0.003 inch in thickness and formed of polyethylene, although cellophane, Mylar plastic and other films may be used. This composite is drawn through a press so that it is rolled, kneaded and compacted to squeeze out air and thoroughly wet out and impregnate the mat and rovings.

When the tines are to be molded, web 40 is cut into rectangular pieces of a predetermined size, films 50, 52 are stripped from the rectangular pieces and a multi-layered charge is made for insertion into the mold. The multi-layered laminate is placed into a mold having a suitable die to heat and compress the mass into the solid product illustrated in FIGS. 4 and 5. A suitable mold temperature range is 250°F to 325°F with a pressure of about 100 psi. The solid product comprises a plurality of tines 14 lying parallel to each other in an alternately stepped relationship with the top corners of alternate tines being frangibly connected to the bottom corners of adjacent tines. In this manner, the tines can be easily separated for subsequent connection to the hub of a garden rake.

Figure 4:
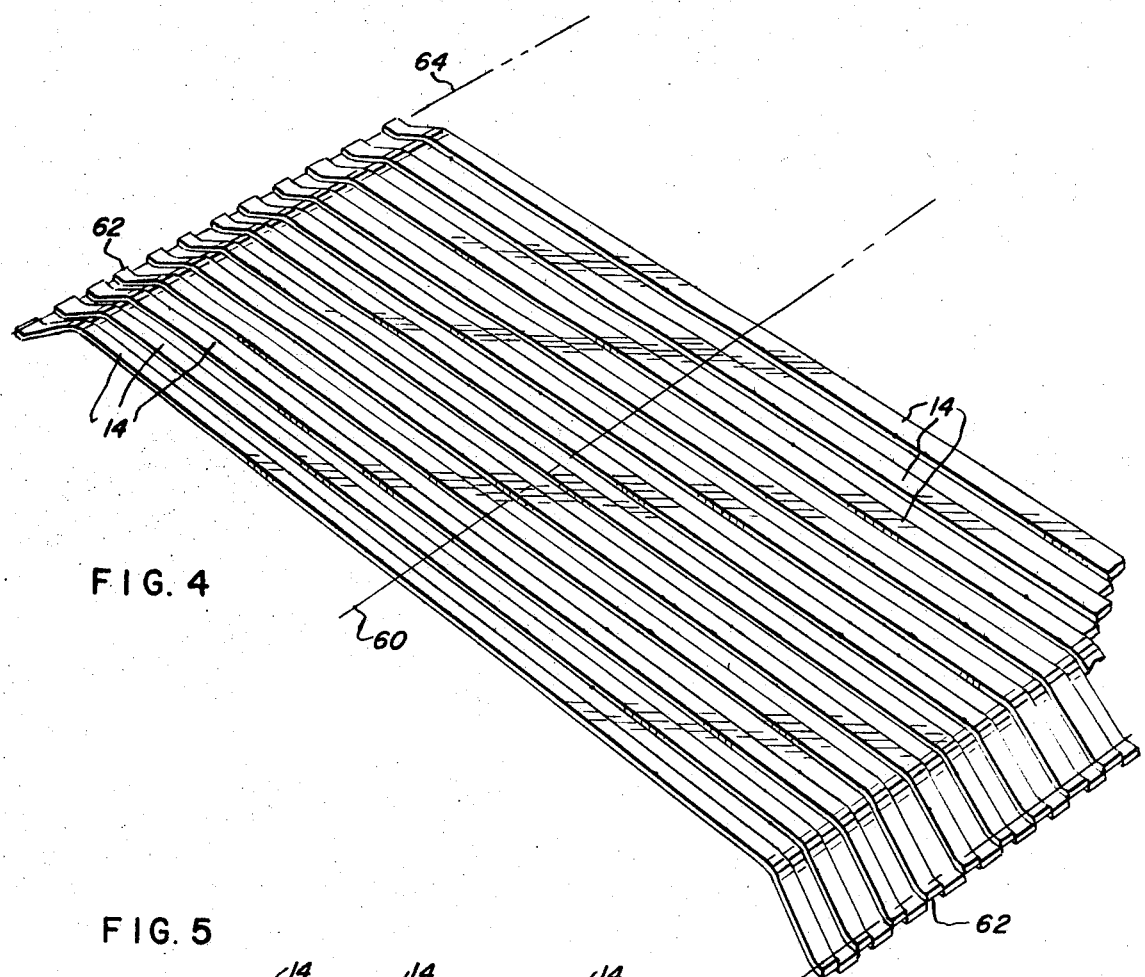
FIG. 4 is a perspective view of the molded product which is subsequently cut and severed to form a number of identical tines in accordance with the principles of the present invention.
Figure 5:
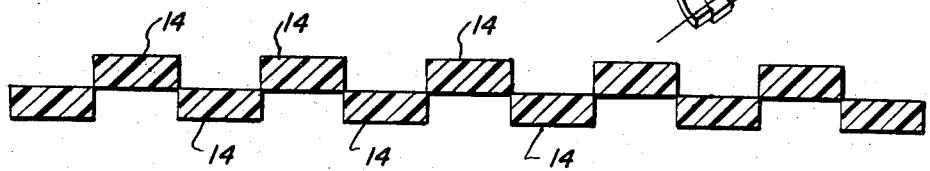
FIG. 5 is an enlarged cross-sectional view of the molded product of FIG. 4.

As shown in FIG. 4, the mold is of a size to form a solid product at least twice the length of a rake tine so that when the solid product is severed along a central cutting line 60, two sets of parallel tines are formed as seen clearly from FIG. 4. The areas 62 at the distal ends of the tines will have extra material due to normal molding procedures and cutting along the lines 64 indicated in FIG. 4 will be necessary.

In a specific example although no limitation is intended, a web is formed of glass mat manufactured by Modiglass Fibers Division of Reichold Chemical Corp., having a thickness of 0.005 inch, with Owens-Corning Fiberglas rovings No. 891-AA-675 collimated and deposited on the mat in the longitudinal direction of the web. The glass rovings and glass mats are coated with Hetron 93LS sold by Hooker Chemical in the manner illustrated in FIG. 3 and the web is cut to produce a laminate formed of five layers of the aforementioned web material, with the rovings extending in the same direction. The laminate is trimmed to size and placed in a tine-forming mold with the rovings extending in the longitudinal direction of the tines to be formed. The mold has a temperature of 275° and exerts a pressure of 100 psi for one minute. Upon release, the product has the configuration illustrated in FIG. 4 and is severed along the cutting lines 60, 64 indicated in FIG. 4.

After the solid product illustrated in FIG. 4 is molded, and the product is severed, the individual tines are separated from each other by simply bending along the frangible corner portions thereof. The tines are then inserted into the grooves 22, 24 of the hub 12 and are fastened at the bottom 30 of grooves 24 by means of Hot Melt adhesive.

In an alternate construction, the tines are fastened to the hub without adhesive. In this construction, the tines are molded with an indent at the inboard end of the tine to cooperate with a protrusion on the bottom surface defining groove 24. Upon insertion of the tine in grooves 22, 24 the protrusion would engage the indent and retain in place the tine.

It is seen that a novel rake has been provided which utilizes tines which are formed of the heat and pressure molded product of a plurality of stacked layers of collimated glass rovings extending substantially in the longitudinal direction of the tine. In the specific example given, the material of which the tines were formed had a modulus to tensile strength ratio of about 30 and the tines were highly vibratory when placed in the hub and found to give a very effective raking action.

Although an illustrative embodiment of the invention has been shown and described, it is to be understood that various modifications and substitutions may be made by those skilled in the art without departing from the novel spirit and scope of the present invention.

What is claimed is:

1. In a rake having a hub for connection to a handle and a plurality of tines projecting from the hub, the improvement comprising said tines being formed of the heat and pressure molded product of a plurality of stacked layers, each of said layers comprising a plurality of collimated glass rovings extending substantially in the longitudinal direction of the tine with a substrate supporting each layer of glass rovings, a resin impregnating the glass rovings and substrate, and separate outer films sandwiching said substrate, rovings and resin of each layer, whereby said tines are formed having a relatively low modulus and high tensile strength.

2. In a rake as described in claim 1, wherein said glass rovings each comprise a plurality of elongated filaments each having a generally circular cross-sectional configuration and a diameter that is less than 0.001 inch.

3. In a rake as described in claim 2, wherein said substrate comprises glass mat having a thickness of between 0.005 inch and 0.015 inch.

* * * * *